United States Patent [19]

Hori et al.

[11] Patent Number: 5,091,487

[45] Date of Patent: Feb. 25, 1992

[54] VINYL CHLORIDE RESIN FOR SAFETY GLASS AND PROCESS FOR PREPARATION OF THE RESIN

[75] Inventors: Toshihiko Hori; Eitaro Nakamura, both of Kawasaki; Toyoichi Arai, Takaoka, all of Japan

[73] Assignee: Nippon Zeon Co., Ltd., Tokyo, Japan

[21] Appl. No.: 520,426

[22] Filed: May 8, 1990

[30] Foreign Application Priority Data

May 10, 1989 [JP] Japan .................................. 1-116477
Apr. 25, 1990 [JP] Japan .................................. 2-107507

[51] Int. Cl.$^5$ ...................... C08F 214/06; B32B 17/10
[52] U.S. Cl. .................................... 526/87; 428/415;
428/441; 428/442; 524/527; 524/531; 524/548;
526/266; 526/273
[58] Field of Search .................... 526/87, 266, 273;
428/415, 441, 442; 524/548

[56] References Cited

U.S. PATENT DOCUMENTS

| | | | |
|---|---|---|---|
| 4,382,996 | 5/1983 | Takeshi | 428/442 |
| 4,389,508 | 6/1983 | Takeshi | 524/548 |
| 4,397,976 | 8/1983 | Takeshi | 524/178 |
| 4,829,101 | 5/1989 | Kraemer | 523/201 |

Primary Examiner—Joseph L. Schofer
Assistant Examiner—Fred Zitomer
Attorney, Agent, or Firm—Armstrong, Nikaido, Marmelstein, Kubovcik & Murray

[57] ABSTRACT

A vinyl chloride resin for safety glass, comprising either particles of a copolymer of a vinyl chloride monomer and an epoxy-containing monomer, having a particle diameter up to 5 μm and a greater epoxy content in an outer portion than in a an inner portion of the particles, or agglomerates of the particles, and process for the preparation of this resin, comprising either adding an epoxy-containing monomer into a polymerization reaction mixture of a vinyl chloride monomer substantially during a latter half of the polymerization reaction of the polymerization mixture or adding an epoxy-containing monomer and a vinyl chloride monomer either in the form of a mixture solution or separately but at the same time into a polymerization mixture of the vinyl chloride monomer.

5 Claims, 1 Drawing Sheet

0.1μm 0.1μm

VINYL CHLORIDE RESIN FOR SAFETY GLASS AND PROCESS FOR PREPARATION OF THE RESIN

BACKGROUND OF THE INVENTION

The present invention relates to a vinyl chloride resin excellent in adhesive strength and a process for the preparation of such resin. More particularly, the invention relates to a vinyl chloride resin for a safety glass which can give safety glass excellent in the resistance to penetration and impact and also to a process for the preparation of this resin.

As is well known, a plasticized polyvinyl butyral film has been used as an interlayer for a safety glass. However, this plasticized polyvinyl butyral film has a problem in that the surface of the film is highly self-adhesive to cause blocking in the winding step after the molding of the film. Therefore, it has been necessary in order to inhibit the blocking that the film is embossed and sprayed with an anti-blocking agent such as sodium hydrogen carbonate.

Meanwhile, vinyl chloride-glycidyl methacrylate copolymer film containing about 40 % by weight of a plasticizer has been known as a film which hardly causes blocking. Further, Japanese Patent Application Kokai Publication No. 55-162451 has proposed an interlayer made of a composition which comprises a copolymer comprising vinyl chloride, glycidyl methacrylate and at least one monomer selected from among ethylenically unsaturated hydrocarbons, vinyl esters of fatty acids, acrylates and vinyl ethers, and a plasticizer.

The adhesive strength of each of these vinyl chloride copolymers to glass can be improved by changing the glycidyl methacrylate content thereof. However, an increase in the glycidyl methacrylate content brings about a lowering in the penetration resistance of the resulting safety glass, so that it is difficult to obtain a safety glass excellent in both adhesive strength and penetration resistance. Further, such an increase lowers the yield in the polymerization or gives a copolymer which is lowered in heat stability to cause discoloration. Moreover, it tends to occur during the preparation of the copolymer resin that scales become attached on the wall surface of the polymerization reactor and/or that the plastisol undergoes a change (an increase in the viscosity) with the lapse of time.

SUMMARY OF THE INVENTION

An object of the present invention is to provide a vinyl chloride resin for a safety glass which is excellent in the adhesive strength and the penetration resistance, and also a process for the preparation of such resin.

Another object of the invention is to provide a process for preparing a vinyl chloride resin for safety glasses according to which the amount of scale tending to attach on the wall surface of the polymerization reactor during the preparation of the resin can be suppressed, the initial viscosity of the plastisol can be relatively low and the change of the viscosity with the lapse of time can be suppressed.

The object of the present invention can be attained by a vinyl chloride resin for a safety glass which is constituted of particles, each having a particle diameter of at most 5 μm, of a copolymer comprising vinyl chloride and an epoxy-containing monomer or an agglomerate of said particles, wherein the epoxy content of the outer portion of the particle is higher than that of the inner portion thereof. Also, according to the present invention, the vinyl chloride resin is prepared by a process of adding an epoxy-containing monomer to a polymerization reaction mixture containing a vinyl chloride monomer substantially during a latter half of the polymerization reaction of the polymerization reaction mixture or a process of adding an epoxy-containing monomer and a vinyl chloride monomer to a polymerization reaction mixture containing the vinyl chloride monomer.

DESCRIPTION OF THE PREFERRED EMBODIMENTS

Figure 1:
FIG. 1 is an electron micrograph showing the section of a polymer particle prepared in Example 1.

The resin of the present invention is a copolymer comprising vinyl chloride and an epoxy-containing monomer (hereinafter referred to also as the "epoxy-containing vinyl chloride resin"). Examples of the epoxy-containing monomer include glycidyl ethers of unsaturated alcohols such as allyl glycidyl ether and methallyl glycidyl ether; glycidyl esters of unsaturated carboxylic acids such as glycidyl methacrylate, glycidyl acrylate, glycidyl p-vinylbenzoate, methyl glycidyl itaconate, glycidyl ethyl maleate, glycidyl vinylsulfonate and glycidyl (meth)allylsulfonate; olefin epoxides such as butadiene monoxide, vinylcyclohexene monoxide and 2-methyl-5,6-epoxyhexene.

Alternatively, the resin of the present invention may be a copolymer comprising vinyl chloride, an epoxy-containing monomer and a monomer which is copolymerizable therewith. Examples of the monomer to be arbitrarily used include vinyl esters of fatty acids such as vinyl acetate and vinyl propionate; olefins such as ethylene and propylene; vinylidene halides such as vinylidene chloride and vinylidene fluoride; vinyl ethers such as isobutyl vinyl ether, methyl vinyl ether and cetyl vinyl ether; and allyl compounds such as allyl chloride and methyl allyl ether.

The epoxy-containing vinyl chloride resin can be prepared from the monomers described above by a conventional process for the polymerization of vinyl chloride, such as bulk, suspension, micro-suspension or emulsion polymerization.

For example, suspension polymerization is preferable, when an interlayer for a safety glass is prepared by calendering, extrusion casting or inflation, i.e., when a filmy agglomerate of the copolymer particles is prepared.

Meanwhile, when the vinyl chloride resin of the present invention is used as a plastisol, emulsion or micro-suspension polymerization, which has been favorably applied to the polymerization of a vinyl chloride resin for the paste process, is preferable from the standpoint of keeping the fluidity of the plastisol on a suitable level.

The effect of the present invention is exhibited even when the vinyl chloride resin is prepared by any of the above polymerization processes. However, the effect is efficiently attained when it is prepared by the emulsion or micro-suspension polymerization process which can give polymer particles each having a particle diameter of as small as 5 μm or below. If the particle diameter is larger than 5 μm, an epoxy group will not always be distributed in the outer layer of the polymer particle to result in poor adhesion to glass.

The resin of the present invention can be prepared according to the above polymerization process by either adding an epoxy-containing monomer to the reaction mixture of gradually enhancing the feed rate of the monomer to thereby increase the epoxy content of the outer portion of the polymer particle after the polymerization conversion of the vinyl chloride monomer at the time of addition of the epoxy-containing monomer reaches at least 40%, namely substantially during a latter half of the polymerization.

According to another method utilizing one of the above polymerization processes according to the invention, an epoxy-containing monomer and a vinyl chloride monomer is fed into the reaction mixture either continuously or in lump or in portions substantially during a latter half of the polymerization reaction of the vinyl chloride monomer. Alternatively, the feeding of an epoxy-containing monomer and a vinyl chloride into the reaction mixture can be made either at an initial stage or at a later stage of the polymerization reaction of the vinyl chloride monomer in a manner of gradually increasing the feeding rate.

Further, the epoxy-containing monomer and the vinyl chloride monomer may be added to the reaction mixture containing the vinyl chloride monomer either in the form of a mixture solution or separately but at the same time.

The ratio of the epoxy-containing monomer and the vinyl chloride monomer, namely the ratio of the former to the latter (epoxy group-containing monomer/ vinyl chloride monomer) is preferably 5 to 30% by weight. If this ratio is less than 5 wt.%, the amount of the epoxy-containing monomer is so small that a sufficient adhesion cannot be attained. On the other hand, if it is more than 30wt.%, the change of the plastisol viscosity with the lapse of time tends to increase. Therefore, a mixing ratio outside the above preferred range is not desirable.

According to the invention, an epoxy-containing monomer and a vinyl chloride monomer is added either in the form of a mixture solution or separately but at the same time as described above to increase the content of the epoxy group in the polymer for forming the outer shell of the polymer.

As well known, since a vinyl chloride polymer is insoluble in its monomer (i.e., vinyl chloride), the polymer formed by the polymerization separates from the monomer molecules in the solution.

Accordingly, by feeding an epoxy-containing monomer substantially in the latter half of the polymerization, polymer particles each containing a large amount of an epoxy group in its outer portion or an agglomerate thereof can be prepared according to suspension or bulk polymerization.

Particularly, polymer particles each having an epoxy-rich outer portion can be effectively prepared by microsuspension polymerization wherein the diameter of the monomer droplet is as small as about 1 μm.

Further, the resin of the present invention can be also prepared according to the emulsion polymerization process by feeding an epoxy-containing monomer to the reaction system substantially in the latter half of the polymerization, because the polymerization site in the emulsion polymerization is the surface of the polymer which is always in contact with water.

The epoxy content of the outer portion of the polymer particle according to the present invention is preferably 0.1 to 5 % by weight. If the epoxy content is less than 0.1 % by weight, the adhesive strength of the resin to glass will be insufficient, while if it exceeds 5 % by weight, it will be difficult to balance the adhesive strength with the penetration resistance.

The degree of the polymerization of the epoxy-containing vinyl chloride resin is preferably 600 to 3000. If it is less than 600, the penetration resistance of the resulting safety glass will be low, while if it exceeds 3000, the film formation or the gelation will necessitate much heat to enhance the production cost.

In use of the vinyl chloride resin according to the present invention, it may be added with any of various additives such as plasticizer, stabilizer, ultraviolet absorber, antioxidant, lubricant, filler or coloring agent depending upon the object. Further, the resin may be mixed with other resin compatible therewith such as other vinyl chloride resin, acrylic resin or epoxy resin.

The plasticizer to be used may be selected from among various compounds which are generally used as a plasticizer for polyvinyl chlorides.

Examples thereof include aliphatic plasticizers such as dioctyl adipate, butyldiglycol adipate, dioctyl azelate, dibutyl sebacate and diisodecyl adipate; phthalate plasticizers such as dioctyl phthalate, dibutyl phthalate, diisobutyl phthalate, butyl benzyl phthalate, dilauryl phthalate and diheptyl phthalate; phosphate or phosphite plasticizers such as trixylenyl phosphate, tricresyl phosphate, cresyl diphenyl phosphate, tris(chloroethyl) phosphate, tris(chloroethyl) phosphite and tributyl phosphate; and epoxy plasticizers such as epoxidized soybean oil and epoxy fatty acid monoesters. In some cases, polyester plasticizers may be used. The amount of the plasticizer to be added is suitably 20 to 80 parts by weight per 100 parts by weight of the vinyl chloride resin. If the amount is too large, the strength of the resulting film will be low, while if it is too small, the resulting film will be too hard.

Preferred examples of the heat stabilizer to be used include fatty acid salts of alkyltin compound such as butyltin laurate, butyltin maleate and octyltin maleate; and alkyltin-containing sulfur compounds such as di-n-octyltin bis(isooctylthioglycolate). These stabilizers may be each used together with a metal soap stabilizer.

The ultraviolet absorber to be used is preferably a benzotriazole compound and examples thereof include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and 2-(2'-hydroxy-4'-octoxyphenyl)benzotriazole.

The antioxidant to be used is preferably a phenolic one and examples thereof include 2,6-di-tert-butyl-p-cresol, 2,2'-methylenebis(4-methyl-6-tert-butylphenol), 4,4'-butylidenebis(3-methyl-6-tert-butylphenol) and 4,4'-thiobis(3-methyl-6-tert-butylphenol).

If necessary, crosslinking agent, thickener, diluent and/or silane or titanate coupling agent may be used.

The production of a safety glass from the vinyl chloride resin of the present invention can be carried out by a conventional process comprising molding the resin into a film or a sheet, sandwitching the film or sheet between glass plates and heating the obtained laminate under load.

Alternatively, it may be carried out by a new high-productivity process for the production of a safety glass as disclosed in Japanese Patent Application Kokai Publication No. 63-134539. That is, as well known in the paste process, the vinyl chloride resin is mixed with additives such as plasticizer, stabilizer, ultraviolet absorber and/or antioxidant and the obtained mixture is deaerated to give a plastisol. This plastisol is handleable as liquid, so that refuse and foreign substance can be removed from the plastisol only by filtration and the storage and transportation thereof can be carried out in a closed system using a tank and/or pipe line. Accordingly, the quality control of the plastisol is easy and the production process can readily be made automatic and continuous. The plastisol thus prepared is put between glass plates and allowed to gel by heating with a conventional heater for the paste process to give a safety glass.

In the vinyl chloride resin of the present invention, the epoxy content of the outer portion of the resin particle is higher than that of the inner portion thereof. Meanwhile, in the production of a safety glass, glass comes into contact with the outer portion of the resin particle, i.e., an epoxy-rich part thereof. Accordingly, the adhesive strength between two glasses can be remarkably enhanced even if the production is carried out either of the above processes. Further, in the production of a safety glass according to the above plastisol process, no pressurizing equipment such as autoclave is necessitated, because the plastisol is filled between glass plates so as not to form any air bubble therein.

As described above, the present invention provides a vinyl chloride resin for a safety glass which is superior to that of the prior art with respect to the adhesive strength and the penetration resistance.

The present invention will now be described in more detail by referring to the following Examples. In the following Examples and Comparative Examples, all parts and percentages are by weight, unless otherwise stated.

EXAMPLE 1

160 parts of deionized water, 0.4 part of sodium dioctyl sulfosuccinate, 1 part of lauryl alcohol and 0.4 part of lauroyl peroxide were fed into a 1000-l stainless steel autoclave. The autoclave was deaerated under a reduced pressure, followed by the addition of 97 parts of vinyl chloride. The contents were stirred to obtain an emulsion. This emulsion was homogenized with a homogenizer, transferred to another deaerated 1000-l autoclave and heated to raise the temperature to 45° C. Thus, the polymerization was initiated. After 5 hours from the temperature rise, the degree of polymerization reached 61 %. 3 parts of glycidyl methacrylate was continuously fed into the autoclave over a period of 3 hours from this point, while continuing the polymerization. After 10 hours, the polymerization was stopped to recover unreacted monomer under a reduced pressure. The remaining reaction mixture was dried with a spray dryer and pulverized to give a resin.

100 parts of the resin was mixed with 45 parts of dioctyl adipate, 15 parts of dioctyl phthalate, 4 parts of dibutyltin polymercaptide and 0.3 part of 2,2'-methylenebis-(4-methyl-6-t-butylphenol) in a Hobart mixer, followed by deaeration. Thus, a plastisol was obtained. This plastisol was applied to a glass plate (15 cm × 10 cm × 3 mm) with a doctor blade. A polyethylene terephthalate film having a thickness of 20 μm was put thereon so as not to form any air bubble. The obtained laminate was heated at 200° C. for 15 minutes to obtain a bilayer glass ① having a 0.8 mm thick resin layer. Separately, the above plastisol was applied to a glass plate (30 cm × 30 cm × 3 mm) with a roll coater. Another glass plate (30 cm × 30 cm × 3 mm) was put thereon so as not to form any air bubble. The obtained laminate was heated at 200° C. for 15 minutes. Thus, two safety glasses ① each having a thickness of 6.8 mm were obtained.

EXAMPLE 2

160 parts of deionized water, 0.4 part of sodium dioctyl sulfosuccinate, 1 part of lauryl alcohol and 0.4 part of lauroyl peroxide were fed into a 1000-l stainless steel autoclave. The autoclave was deaerated under a reduced pressure, followed by the addition of 94 parts of vinyl chloride and 3 parts of allyl chloride. The contents were stirred to give an emulsion. This emulsion was homogenized with a homogenizer, transferred to another deaerated 1000-( autoclave and heated to 52° C. initiate the polymerization. The subsequent steps were carried out in the same manner as that described in Example 1 except that 30 part (not 45 parts) of dioctyl adipate and 10 parts (not 15 parts) of dioctyl phthalate were used. Thus, a bilayer glass ② and two safety glasses ② were obtained.

EXAMPLE 3

160 parts of deionized water, 0.4 part of sodium dioctyl sulfosuccinate, 1 part of lauryl alcohol and 0.4 part of lauroyl peroxide were fed into a 1000-l stainless steel autoclave. The autoclave was deaerated under a reduced pressure, followed by the addition of 96.5 parts of vinyl chloride. The contents were stirred to give an emulsion. This emulsion was homogenized with a homogenizer, transferred to another deaerated 1000-l autoclave and heated to 45° C. to initiate the polymerization. 1.5 parts of glycidyl methacrylate was fed into the autoclave over a period of 6 hours from the initiation of the polymerization and 2 parts thereof was fed over a period of 2 hours thereafter. After 10 hours, the polymerization was stopped. The subsequent steps were carried out in the same manner as that of Example 1 to obtain a bilayer glass ③ and two safety glasses ③.

EXAMPLE 4

10 g of cumene hydroperoxide, 10 g of t-butyl hydroperoxide, 500 g of sodium lauryl sulfate and 10 kg of deionized water were mixed together with a high-speed mixer to obtain a hydroperoxide emulsion. Separately, 1.6 kg of sodium lauryl sulfate and 28.5 kg of deionized water were mixed together to give an aqueous solution of an emulsifying agent.

325 kg of deionized water, 50 kg of a latex containing 30 % by weight of vinyl chloride homopolymer particles having a mean particle diameter of 0.45 μm. 150 g of (-ascorbic acid, 6 g of sodium ethylenediamine-tetraaceto ferrate (II) and 2.5 kg of sodium pyrophosphate were fed into a 1000-l stainless steel autoclave. The autoclave was twice purged with nitrogen and twice deaerated under a reduced pressure, followed by the addition of 357.5 kg of vinyl chloride. The temperature of the contents was raised to 50° C. by jacket heating, while stirring the contents. The aqueous solution of an emulsifying agent and hydroperoxide emulsion prepared above were fed into the reaction system at a rate of 2.8 l/hr and 1 l/hr, respectively, while keeping the reaction system at 50° C. The introduction of the aqueous solution of an emulsifying agent was continued at the constant rate for 10.5 hours and stopped. On the other hand, the hydroperoxide emulsion was at first introduced at the above rate and when the conversion reached 40.5 % after about 6 hours from the initiation of the introduction, the rate was changed to 0.7 1/hr and the introduction of 15.9 g of glycidyl methacrylate at a rate of 3 kg/hr was initiated.

After 12 hours and 10 minutes from the initiation of the reaction, the reaction was stopped and the reaction mixture was cooled. The conversion was 91.3 %. Simultaneously with the cooling, a solution of 0.5 kg of sodium lauryl sulfate and 1.0 kg of polyoxyethylene sorbitan monostearate in 10 kg of deionized water was added to the reaction mixture to recover unreacted monomer. The subsequent steps were carried out in the same manner as that of Example 1 to give a bilayer glass ④ and two safety glasses ④.

COMPARATIVE EXAMPLE 1

The same procedure as that described in Example 1 was repeated except that glycidyl methacrylate was continuously fed over a period of 8 hours just after the temperature rise (not initiated after 5 hours from the temperature rise). Thus, a bilayer glass ⑤ and two safety glasses ⑤ were obtained.

COMPARATIVE EXAMPLE 2

The water content of a commercially available interlayer for a safety glass (made of polyvinyl butyral, thickness: 30 mil) was adjusted to 0.5 % by weight. The resulting interlayer, a 20 μm thick polyethylene terephthalate film and a cover glass (30 cm x 30 cm x 3 mm) were put on a 3 mm thick glass plate successively to give a laminate [1]. This laminate [1] was put in a rubber bag and kept at 120° C. for 30 minutes under a reduced pressure to carry out preliminary contact bonding. Separately, the same interlayer having a water content adjusted to 0.5 % by weight as that used above was sandwitched between two glass plates (30 cm × 30 cm × 3 mm), followed by the preliminary contact bonding in a rubber bag. Thus, two laminates [2] were obtained. The laminates [1] and [2] were each pressbonded under the conditions of 140° C. and 13 to 15 kg/cm² in a pneumatic autoclave for 30 minutes. The resulting laminate [1] was freed from the cover glass. Thus, a bilayer glass ⑥ and two safety glasses ⑥ were obtained.

EXAMPLE 5

The polymer particles prepared in Example 1 and Comparative Example 1 were stained and observed under an electron microscope. The results are given in FIG. 1 (Example 1) and FIG. 2 (Comparative Example 1).

Figure 2:
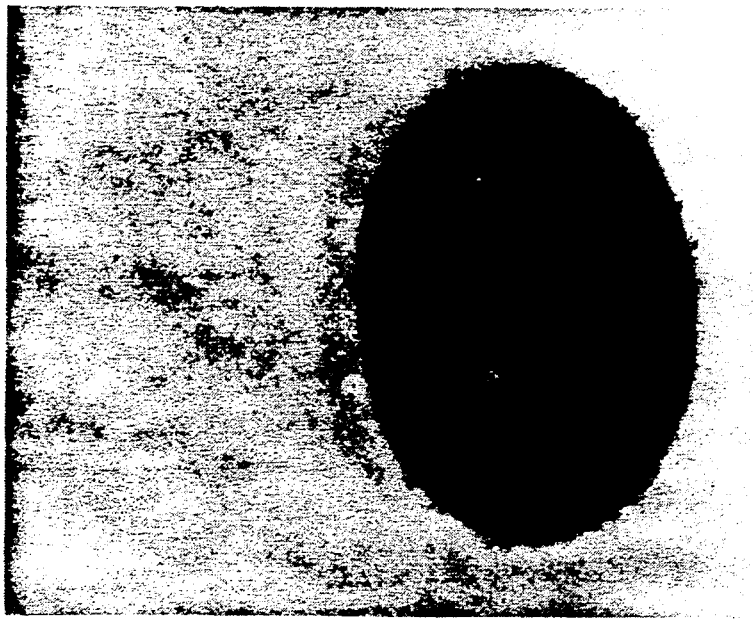
FIG. 2 is an electron micrograph showing the section of a polymer particle prepared in Comparative Example 1.

In FIG. 1, the epoxy-rich outer portion of the particle was in a state stained black with ruthenic acid, while in FIG. 2, the brightness was nearly even all over the particle, suggesting that an epoxy group is nearly evenly distributed all over the particle.

EXAMPLE 6

160 parts of deionized water, 0.4 parts of sodium dioctyl sulfosuccinate, 1 part of lauryl alcohol and 0.4 parts of lauroyl peroxide were fed into a 1000-l stainless steel autoclave. The autoclave was deaerated under a reduced pressure, followed by the addition of 87 parts of vinyl chloride. The contents were stirred to obtain an emulsion. This emulsion was homogenized with a homogenizer, transferred to another deaerated 1000-l autoclave and heated to raise the temperature to 45° C.

Thus, the polymerization was initiated. After 4 hours from the temperature rise, the degree of polymerization reached 47%, so that a solution prepared by mixing together 3 parts of glycidyl methacrylate and 10 parts of vinyl chloride was continuously fed into the autoclave over a period of 3 hours from this point, while continuing the polymerization. After 10 hours, the polymerization was stopped to recover unreacted monomer under a reduced pressure. The remaining reaction mixture was dried with a spray dryer and pulverized to give a resin.

100 parts of the resin was mixed with 45 parts of dioctyl adipate, 15 parts of dioctyl phthalate, 4 parts of dibutyltin polymercaptide and 0.3 parts of 2,2'-methylenebis-(4-methyl-6-t-butylphenol) in a Hobart mixer, followed by deaeration. Thus, a plastisol was obtained. This plastisol was applied to a glass plate (15 cm × 10 cm × 3 mm) with a doctor blade. A polyethylene terephthalate film having a thickness of 20 μm was put thereon so as not to form any air bubble. The obtained laminate was heated at 200° C. for 15 minutes to obtain a bilayer glass ⑦ having a 0.8 mm thick resin layer. Separately, the above plastisol was applied to a glass plate (30 cm × 30 cm × 3 mm) with a roll coater. Another glass plate (30 cm × 30 cm × 3 mm) was put thereon so as not to form any air bubble. The obtained laminate was heated at 200° C. for 15 minutes. Thus, two safety glasses ⑦ each having a thickness of 6.8 mm were obtained.

EXAMPLE 7

160 parts of deionized water, 0.4 parts of sodium dioctyl sulfosuccinate, 1 part of lauryl alcohol and 0.4 parts of lauroyl peroxide were fed into a 1000-l stainless steel autoclave. The autoclave was deaerated under a reduced pressure, followed by the addition of 84.5 parts of vinyl chloride and 2.5 parts of vinylidene chloride. The contents were stirred to give an emulsion. This emulsion was homogenized with a homogenizer, transferred to another deaerated 1000-l autoclave and heated to 47° C. initiate the polymerization. The subsequent steps were carried out in the same manner as that described in Example 1 except that 30 parts (not 45 parts) of dioctyl adipate and 10 parts (not 15 parts) of dioctyl phthalate were used. Thus, a bilayer glass ⑧ and two safety glasses ⑧ were obtained.

EXAMPLE 8

160 parts of deionized water, 0.4 part of sodium dioctyl sulfosuccinate, 1 part of lauryl alcohol and 0.4 part of lauroyl peroxide were fed into a 1000-l stainless steel autoclave. The autoclave was deaerated under a reduced pressure, followed by the addition of 67 parts of vinyl chloride. The contents were stirred to give an emulsion. This emulsion was homogenized with a homogenizer, transferred to another deaerated 1000-l autoclave and heated to 45° C. to initiate the polymerization. Then, a solution prepared by mixing together by a static line mixer 1 part of glycidyl methacrylate and 10 parts of vinyl chloride was charged over 4 hours after the initiation of the polymerization. Further, a solution prepared by mixing together by a static line mixer 2 parts of glycidyl methacrylate and 20 parts of vinyl chloride was charged over 4 hours of from the 4th hour to the 8th hour after the initiation of the polymerization, and the polymerization was completed in 10 hours. The subsequent steps were carried out in the same manner as that of Example 1 to obtain a bilayer glass ⑨ and two safety glasses ⑨.

EXAMPLE 9

10 g of cumene hydroperoxide, 10 g of t-butyl hydroperoxide, 500 g of sodium lauryl sulfate and 10 kg of deionized water were mixed together with a high-speed mixer to obtain a hydroperoxide emulsion. Separately, 1.6 kg of sodium lauryl sulfate and 28.5 kg of deionized water were mixed together to give an aqueous solution of an emulsifying agent.

325 kg of deionized water, 50 kg of a latex containing 30 % by weight of vinyl chloride homopolymer particles having a mean particle diameter of 0.45 μm, 150 g of l-ascorbic acid, 6 g of sodium ethylenediaminetetraaceto ferrate (II) and 2.5 kg of sodium pyrophosphate were fed into a 1000-l stainless steel autoclave. The autoclave was twice purged with nitrogen and twice deaerated under a reduced pressure, followed by the addition of 309.8 kg of vinyl chloride. The temperature of the contents was raised to 50° C. by jacket heating, while stirring the contents. The aqueous solution of an emulsifying agent and hydroperoxide emulsion prepared above were fed into the reaction system at a rate of 2.8 l/hr and 1 l/hr, respectively, while keeping the reaction system at 50° C. The introduction of the aqueous solution of an emulsifying agent was continued at the constant rate for 10.5 hours and stopped. On the other hand, the hydroperoxide emulsion was at first introduced at the above rate and when the conversion reached 50.5 % after about 6 hours from the initiation of the introduction, the rate was changed to 0.7 (/hr and a mixture solution 15.9 kg of glycidyl methacrylate and 47.7 kg of vinyl chloride, preparatively prepared in a mixing vessel, was introduced at a rate of 13.4 kg/hr.

After 11 hours and 30 minutes from the initiation of the reaction, the reaction was stopped and the reaction mixture was cooled. The conversion was 92.5 %. Simultaneously with the cooling, a solution of 0.5 kg of sodium lauryl sulfate and 1.0 kg of polyoxyethylene sorbitan monostearate in 10 kg of deionized water was added to the reaction mixture to recover unreacted monomer. The subsequent steps were carried out in the same manner as that of Example 1 to give a bilayer glass 10 and two safety glasses ⑩.

The safety glasses prepared in Examples 1 to 9 and Comparative Examples 1 and 2 were examined for transparency, penetration resistance, impact resistance and adhesive strength by the following methods according to JIS R 3212 "Test Method of Safety Glass for Road Vehicles" and the results are given in the Table hereinbelow:

1. Transparency (transmittance of visible light)

One set of the safety glasses ① to ⑩ was examined for transmittance in a wavelength range of 380 to 750 nm with a spectrophotometer (mfd. by Hitachi, Ltd.).

2. Penetration resistance

The safety glasses ① to ⑩ which had been examined for transparency were allowed to stand at 20° C. for 2 hours. A steel ball having a weight of 2.27 kg was dropped from a height of 4 m on the center of each of the safety glasses to determine whether the ball penetrated the glass or not.

3. Impact resistance

Another set of the safety glasses ① to ⑩ was allowed to stand at 23° C. for 2 hours. A 227 g steel ball was dropped from a height of 9 m on each of the safety glasses to determine the total weight of the glass peeled off from the surface opposite to that against which the ball had impinged.

4. Adhesive strength

The bilayer glasses ① to ⑩ were allowed to stand at 23° C. for 2 hours. A part of the interlayer was peeled from each of the bilayer glasses to determine the T-peel adhesive strength at a rate of 300 mm/min.

5. Amount of Agglomerates

Latex was passed through a 80 mesh screen, and the on-screen polymer was dried and weighed. The weight value found was divided by the total polymer weight, and the quotient thus obtained was taken as the amount of agglomerates. The found values are shown in the below Table.

6. Viscosity and Aging Index

Of each plastisol maintained at 23° C., the viscosity was measured by a B-type viscometer (rotor No. 4), and the found value was taken as the initial viscosity. After the plastisol was left still at 23° C. for 7 days, the viscosity of the plastisol was again determined in same manners as above, and according to the following equation, the aging index (A. I.) was calculated.

$$A.\ I. = \frac{\text{viscosity after 7 days}}{\text{initial viscosity}}$$

The below Table also shows the results of the above determinations.

TABLE

|  | Ex. 6 | Ex. 7 | Ex. 8 | Ex. 9 | Ex. 1 | Ex. 2 | Ex. 3 | Ex. 4 | Ex. 5 | Comp. Ex. 1 | Comp. Ex. 2 |
|---|---|---|---|---|---|---|---|---|---|---|---|
| Conversion* (%) | 47 | 45 | 49 | 50.5 | 61 | 58 | 55 | 40.5 | — | 0 | — |
| Final conversion (%) | 85 | 83 | 81 | 92.5 | 85 | 88 | 84 | 91.3 | — | 82 | — |
| Epoxy content in interlayer (%) | 0.64 | 0.66 | 0.72 | 0.80 | 0.55 | 0.64 | 0.65 | 0.79 | — | 0.55 | — |
| T-peel adhesive strength (kg/cm) | 6.5 | 7.0 | 6.0 | 5.8 | 3.8 | 4.0 | 3.7 | 3.8 | 4.0 | 2.0 | 4.0 |
| Performance of safety glass | | | | | | | | | | | |
| transparency | 88.9 | 88.3 | 88.0 | 88.5 | 88.7 | 86.5 | 87.0 | 88.0 | 88.0 | 88.3 | 88.0 |
| penetration resistance | | | | | (no penetration took place) | | | | | | |
| impact resistance | 3 | 2 | 3 | 3 | 4 | 3 | 3 | 5 | 9 | 17 | 9 |
| Mean particle diameter (μm) | 0.7 | 0.8 | 0.8 | 0.2 and 1.1 | 0.9 | 1.0 | 1.0 | 0.2 and 1.1 | — | 0.9 | — |
| Average degree of polymerization | 1240 | 1180 | 1090 | 1350 | 1150 | 1060 | 950 | 1350 | — | 1200 | — |
| Agglomerates (= scale) (wt. %) | 0.8 | 0.5 | 0.9 | 0.8 | 2.3 | 1.8 | 3.8 | 3.8 | — | — | — |
| Initial viscosity (cp) | 7100 | 5800 | 4800 | 8300 | 16600 | 25400 | 17900 | 28100 | — | — | — |
| Viscosity after 7 days (cp) | 6500 | 10400 | 7700 | 15300 | 40800 | 54400 | 40400 | 73900 | — | — | — |

TABLE-continued

|  | Ex. 6 | Ex. 7 | Ex. 8 | Ex. 9 | Ex. 1 | Ex. 2 | Ex. 3 | Ex. 4 | Ex. 5 | Comp. Ex. 1 | Comp. Ex. 2 |
|---|---|---|---|---|---|---|---|---|---|---|---|
| Aging index | 1.59 | 1.79 | 1.60 | 1.84 | 2.46 | 2.14 | 2.26 | 2.63 | — | — | — |

Conversion*: the polymerization conversion at the time of addition of the epoxy-containing monomer From the above Table, it is seen that using the resin according to the present invention, it is possible to obtain a safety glass having remarkable performance characteristics. Also, particularly according to such process pursuant to the invention in which an epoxy-containing monomer and a vinyl chloride monomer is added to a polymerization mixture comprising the vinyl chloride monomer (Examples 6 to 9), it is possible to considerably suppress the amount of scale attached to the wall surface of the polymerization reactor at the time of preparation of the resin. Thus, cleaning of the polymerization reactor can be facilitated, whereby it is possible to enhance the operation efficiency.

With respect to the plastisol viscosity, advantageously the initial viscosity is relatively low, and the change of the viscosity with the lapse of time is also suppressed. In other words, the plastisol has only a relatively low viscosity and has a high stability, whereby the production of the safety glass can be carried out at a desirably high efficiency. Moreover, using the resin according to the invention for or in the production of the safety glass, it is possible to greatly increase the adhesive strength. Although the reasons for this have not been fully elucidated yet, it is inferable that according to the invention, the epoxy groups are uniformly distributed over the particle surfaces to enhance the adhesion.

What is claimed is:

1. A vinyl chloride resin for a safety glass interlayer, said resin consisting of particles or agglomerates thereof of a copolymer comprising a vinyl chloride monomer and an epoxy-containing monomer and having a degree of polymerization of 600 to 3000, said particles each having a particle diameter of at most 5 μm and having an outer portion and an inner portion, the outer portion having an epoxy content 0.1 to 5% by weight and an epoxy content higher than that of the inner portion.

2. A vinyl chloride resin for a safety glass as set forth in claim 1, wherein said copolymer comprises the vinyl chloride, the epoxy-containing monomer and a comonomer which is copolymerizable with said vinyl chloride and said monomer.

3. A vinyl chloride resin for a safety glass as set forth in claim 1, wherein said epoxy-containing monomer is selected from among glycidyl ethers of unsaturated alcohols, glycidyl esters of unsaturated carboxylic acids and epoxide olefins.

4. A vinyl chloride resin for a safety glass as set forth in claim 2, wherein the comonomer which is copolymerizable with the vinyl chloride and the epoxy-containing monomer is selected from among vinyl esters, olefins, vinylidene halides, vinyl ethers and allyl compounds.

5. A safety glass comprising at least two glass plates laminated to other with a vinyl chloride resin interposed between adjacent glass plates, the vinyl chloride resin consisting of particles or agglomerates thereof of a copolymer comprising a vinyl chloride monomer and an epoxy-containing monomer and having a degree of polymerization of 600 to 3000, said particles each having a particle diameter of at most 5 μm and comprising an outer portion and an inner portion, the outer portion having a epoxy content 0.1 to 5% by weight and an epoxy content higher than that of the inner portion.

* * * * *